Feb. 15, 1944.    J. KOLBE    2,341,726
MOTOR VEHICLE
Filed Jan. 17, 1941    7 Sheets-Sheet 2

Fig. 2.

Inventor
Joachim Kolbe
By A. E. Wilson.
Attorney

Feb. 15, 1944. J. KOLBE 2,341,726
MOTOR VEHICLE
Filed Jan. 17, 1941 7 Sheets-Sheet 4

Inventor
Joachim Kolbe
By A. E. Wilson
Attorney

Patented Feb. 15, 1944

2,341,726

UNITED STATES PATENT OFFICE 2,341,726

MOTOR VEHICLE

Joachim Kolbe, Detroit, Mich.

Application January 17, 1941, Serial No. 374,872

19 Claims. (Cl. 280—112)

This invention relates to vehicles, and more particularly to motor vehicles having bodies or superstructures which are so mounted on the wheel supporting means or axles that the body or superstructure may assume an inclined or banked position under the influence of lateral or centrifugal forces to which the vehicle is subjected, such for example as when the vehicle rounds a curve. The invention also contemplates vehicles having the body or superstructure so mounted on the wheel supporting means that the superstructure or body will remain in a substantially level position when subjected to lateral or centrifugal forces.

In certain types of vehicles embodying this invention it is desirable that the superstructure be free to shift laterally and vertically relative to the wheel supporting means when it moves to an inclined or banked position relative to the wheel supporting means. In those types of vehicles it is desirable to interconnect the superstructure and the wheel supporting means by linkage systems in such a manner that the superstructure will be pressed to an inclined position relative to the wheel supporting means when subjected to lateral forces.

It may be understood that the functional idea of this invention shall be the fact that the centrifugal force will be employed to urge not only the superstructure and the rear axle but also the front wheels into an improved operating position with regard to the road as the vehicle rounds a curve, particularly in view of the fact that the newly provided arrangement guarantees independent movement of the front or steerable wheels with regard to each other independently from the variable load and the position of the superstructure. Such improved position of the front wheels will improve the steering of the vehicle, reduce wearing of the tires, and increase the safety and enjoyment of driving the vehicle. As is known, in a vehicle with rigid front axle the vertical displacement of one wheel will influence the position of the other wheel whereby a dangerous gyroscopic swinging may occur, particularly where soft resilient means are employed to absorb vertical shock. In vehicles having independent front wheel suspension as for example where the wheels are mounted on wishbone arms, the wheels will lean to the outside of the curve with the superstructure as the vehicle rounds a curve. This invention avoids both of the disadvantages of dependence of the wheels for movement upon each other, and the leaning of the wheels towards the outside of the curve.

An object of this invention, therefore, is to provide improved wheel supporting means associated with the wheels of a motor vehicle whereby the superstructure may move laterally and vertically relative to the wheel supporting means and assume an inclined or banked position.

A further object is to provide improved connecting means between the wheel supporting means and superstructure of a motor vehicle whereby the superstructure may move laterally and vertically relative to its normal position when it assumes an inclined or banked position.

Another object of this invention is to provide generally horizontally disposed connecting means between the superstructure and wheel supporting means to independently guide the wheels in a substantially vertical position as they move over obstacles in the road, and to maintain them in a substantially straight vertical position or even to guide them into a position inclined to the inside of the curve as the vehicle is subjected to centrifugal forces and the superstructure assumes an inclined or banked position accompanied by a lateral movement relative to its normal position under the influence of the lateral forces exerted.

A further object is to provide novel wheel supporting means whereby the steerable wheels of a motor vehicle are prevented from being forced to an angular inclined position towards the outside of the curve by lateral forces to which the vehicle is subjected.

Yet another object of this invention is to provide an improved coupling connection of connecting means between the superstructure and the front wheel supporting means, and between the superstructure and the rear wheel supporting means of a motor vehicle whereby the superstructure, the front wheels and the rear axle may be guided substantially vertically as they move over obstacles in the road, and whereby the superstructure and the front wheels may lean to the inside of the curve when the vehicle is subjected to centrifugal force as when rounding a curve.

A further object of the invention resides in the provision of a simplified and improved running gear and king pin assembly in connection with the wheel interconnecting means of a vehicle whereby centrifugal force acting on the vehicle tends to induce the superstructure and wheels to assume an angularly inclined or banked position.

Other objects and advantages of this invention will be apparent from the following detailed description, considered in connection with the accompanying drawings, submitted for the purposes of illustration only and not intended to define the scope of the invention, reference being had for that purpose to the subjoined claims.

In the drawings wherein similar reference characters refer to similar parts throughout the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to Figs. 1 to 10 inclusive, the invention is illustrated as applied to a vehicle having a superstructure or body including a longitudinally extending frame member 10. It will be understood that if desired the superstructure and frame may be of the so-called unison type wherein the frame is formed as an integral portion of the body member.

The frame 10 is supported at opposite ends on front or steerable wheels 12 and rear wheels 14. The front or steerable wheels 12 are rotatably mounted on horizontally extending spindles 16 carried by brackets 18 having vertically spaced lower and upper ball and sockets joints 20 and 22 respectively. The lower ball and socket joints 20 are operably interconnected by a transversely extending member 24, and the upper ball and socket joints 22 are operably interconnected by an upper transversely extending member 26.

The lower transversely extending member 24 carries coil springs 28 on opposite sides of the vehicle. The upper ends of the springs 28 are connected with each other by means of a saddle 30 extending transversely of the vehicle. The saddle 30 is operably connected to the frame 10 by means of paired angularly inclined links 32 pivotally connected at their lower ends to the saddle 30 by generally longitudinally extending pivots 34 and pivotally connected at their upper ends to the frame 10 by longitudinally extending pivots 36. Steering movement of the vehicle is effected by turning the spindles 16 and brackets 18 about a generally vertical axis extending through the lower and upper ball joints 20 and 22 respectively.

The lower transverse member 24 is connected to the frame 10 by means of generally longitudinally extending rods 38 by means of ball and socket joints 40 interposed between the rod 38 and the transversely extending member 24 and ball and socket joints 42 interposed between the rod 38 and the frame 10. The upper transverse member 26 is operably connected to the frame 10 by means of generally longitudinally extending rods 44 pivotally connected to the transverse member 26 by means of ball and socket joints 46, and connected to the frame 10 by means of ball and socket joints 48.

The rear wheels 14 are operably connected to each other by means of a rigid axle 50 preferably including a differential 52. The rigid axle 50 is provided with spaced spring supports 54 adapted to support spaced coil springs 56. The upper ends of the springs 56 are connected with each other by means of a spring saddle 58. The spring saddle 58 is connected to the frame 10 by means of paired angularly inclined links 60 pivotally connected longitudinally of the vehicle at their lower ends to the saddle 58 by means of longitudinally extending pivotal connections 62, and connected to the frame 10 at their upper ends by means of longitudinally extending pivotal connections 64.

The rigid axle 50 is also connected to the frame 10 by means of paired lower longitudinally extending rods 66 pivotally connected by means of ball and socket joints 68 to the axle 50. The forward ends of the rods 66 are connected to the frame 10 by ball and socket joints 70. An auxiliary rod 72 positioned in a different plane than the rod 66 may be provided to interconnect the frame and axle to transmit brake and torque forces between the axle and frame. The rod 72 is connected at one end by a ball and socket joint 74 to the frame 10 and is connected at its other end by means of a ball and socket joint 76 to the axle 50.

Stabilizing means may be provided to maintain the front or steerable wheels in alignment with the rear wheels. One form of such stabilizing means is disclosed in my co-pending application Serial No. 223,743, filed August 8, 1938, now Patent No. 2,262,289. Another desirable form comprises a rod 78 interconnecting arms 80 and 82 at the front with an arm 84 at the rear. The arm 80 may be formed integral with the lower longitudinally extending rod 38 and is connected by means of a ball and socket joint 86 with the rod 78. The arm 82 may be formed integral with the upper longitudinally extending rod 44 and is connected to the rod 78 by means of a suitable ball and socket joint 88. The arm 84 at the rear is formed integral with the longitudinally extending rod 66 and is connected to the rod 78 by means of a ball and socket joint 90.

Yielding means may be provided to maintain the body or superstructure in a substantially upright position relative to the front and rear wheel supporting means.

Figure 4:
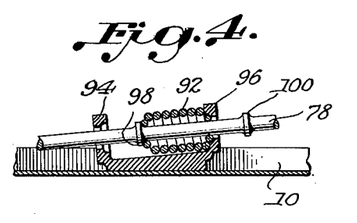
Fig. 4 is a sectional view of a portion of Fig. 3 showing one operative position of the spring for urging the superstructure toward the upright position.
Figure 5:
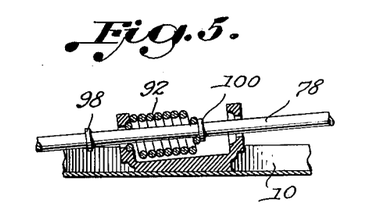
Fig. 5 is a view similar to Fig. 4 showing the spring in the opposite operative position.
Figure 6:
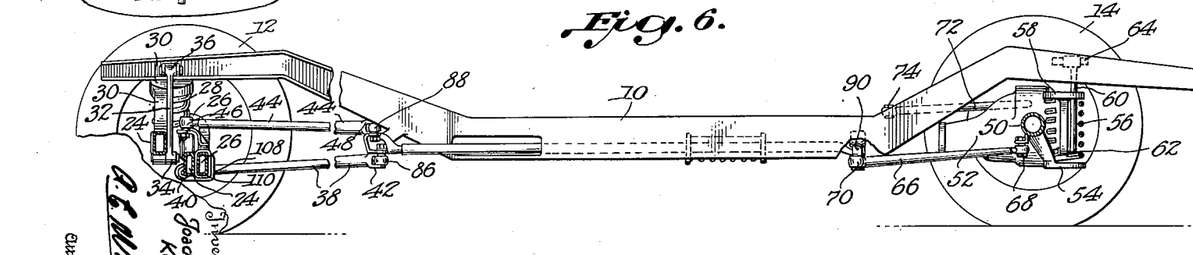
Fig. 6 is a side elevation partly in section of the vehicle illustrated in Fig. 1.
Figure 7:
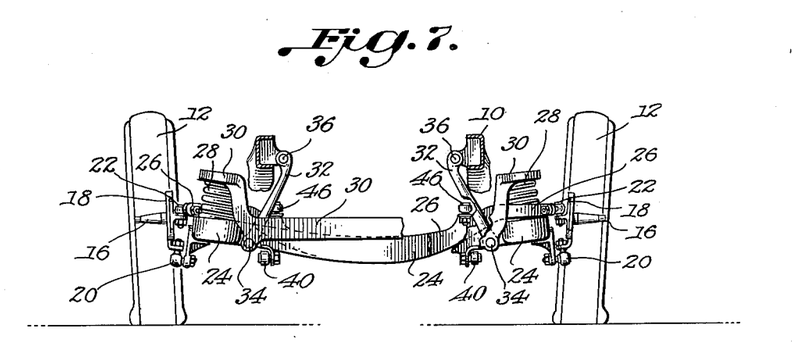
Fig. 7 is a front elevation partly in section also of the vehicle illustrated in Fig. 1.
Figure 8:
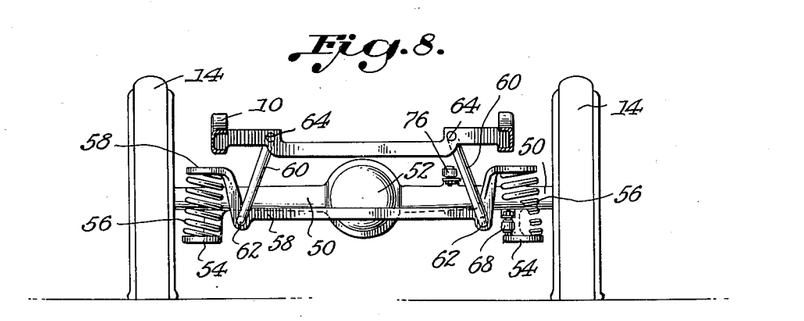
Fig. 8 is a rear elevation partly in section of the vehicle illustrated in Fig. 1.

One desirable form of such yielding means comprises a coil spring 92 interposed between front and rear bracket arms 94 and 96 respectively carried by the frame 10. The spring 92 is preferably concentrically mounted on the rod 78, and is operably connected as illustrated in Figs.

4 and 5 in such a manner that it urges the rod 78 toward a substantially predetermined neutral position relative to the frame 10 to maintain the superstructure or body of the vehicle in a substantially upright position.

It will be noted that shoulders 98 and 100 carried by the forward and rearward portions of the rod 78 are provided to engage and move the spring 92 rearwardly as viewed in Fig. 4 when the superstructure is shifted on the front and rear links 32 and 60 to an angularly inclined position as by rounding a curve to the left.

Fig. 5 illustrates the position of the spring 92 as when the vehicle rounds a curve to the right wherein the rod 78 moves forwardly relative to the brackets 94 and 96 to engage the spring 92 and compress it between the bracket 94 and the shoulder 100 of the rod 78. A full description of the operation of such an arrangement may be found in Kolbe U. S. Letters Patent No. 2,226,435.

Means may be provided to induce the rod 78 to move only longitudinally relative to the vehicle and to prevent it from sagging on its ball and socket joints to produce a binding action with the arms 80, 82 and 84 operably connected to each of its ends. One desirable form of such means comprises a lever 102 pivotally connected in a vertical axis by a pivot 104 to the frame 10 and pivotally connected in a vertical axis at 106 to the rod 78. If desired, shock absorbing means may be associated with the lever 102.

The lower and upper transversely movable members 24 and 26 respectively may be operably interconnected by a bracket 108 and a resilient bushing 110 formed of rubber or other suitable material whereby the turning moment caused by the eccentric load transmitted by the springs 28 to the lower member 24 may be eliminated.

The steerable wheels 12 can move independently of each other because the wheels are connected by the ball and socket joints 20 and 22 in the form of a substantial parallelogram. When one of the wheels is subjected to a vertical impulse which would induce it to elevate, the transversely extending members 24 and 26 pivot about the ball and socket connection on the other side of the vehicle to permit the effected wheel to elevate without a corresponding movement angularly or laterally of the other wheel.

The operation of this device is as follows: If the vehicle rounds a curve and is subjected to centrifugal force as illustrated in Fig. 2, the frame 10 of the superstructure will shift laterally relative to the front and rear wheel supporting means over the links 32 at the front and the links 60 at the rear in a well known manner and assume an angularly inclined position toward the inside of the curve as more fully described in my previously issued patents, Reissue No. 21,605 and No. 2,242,584.

As the frame 10 moves laterally toward the outside of the curve, the ball and socket joints 42, 48, 70 and 74 operably connecting the rods 38, 44, 66 and 72 to the frame, also move laterally toward the outside of the curve. The ball and socket joints 40, 46 in the front and 68 and 76 at the rear being connected to the wheel supporting means, remain in their normal position during the motion of the frame toward the outside of the curve.

The ratio of the length of the lower rod 38 to the length of the upper rod 44 and of the lower arm 80 with respect to the upper arm 82 is such that the lower transversely extending member 24 is maintained in such a lateral relation with respect to the upper transversely extending member 26 that the wheels 12 may be maintained in a substantially vertical position or may even be moved angularly toward the inside of the curve as the vehicle rounds a curve. The movement of the rods 38 and 44 and the arms 80 and 82 is controlled by the longitudinally movable rod 78 operably connected to the arm 84 and therewith to the rod 66 at the rear of the vehicle.

Figure 1:
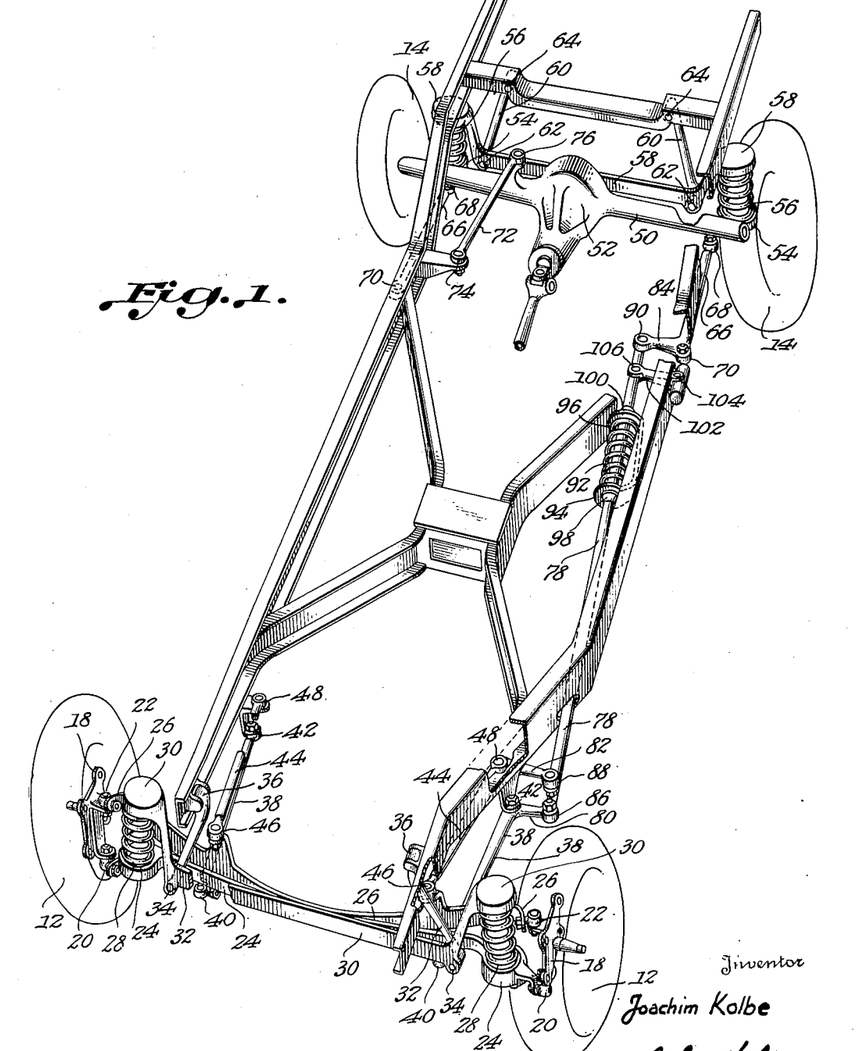
Fig. 1 is a perspective view of a vehicle embodying the present invention.
Figure 2:
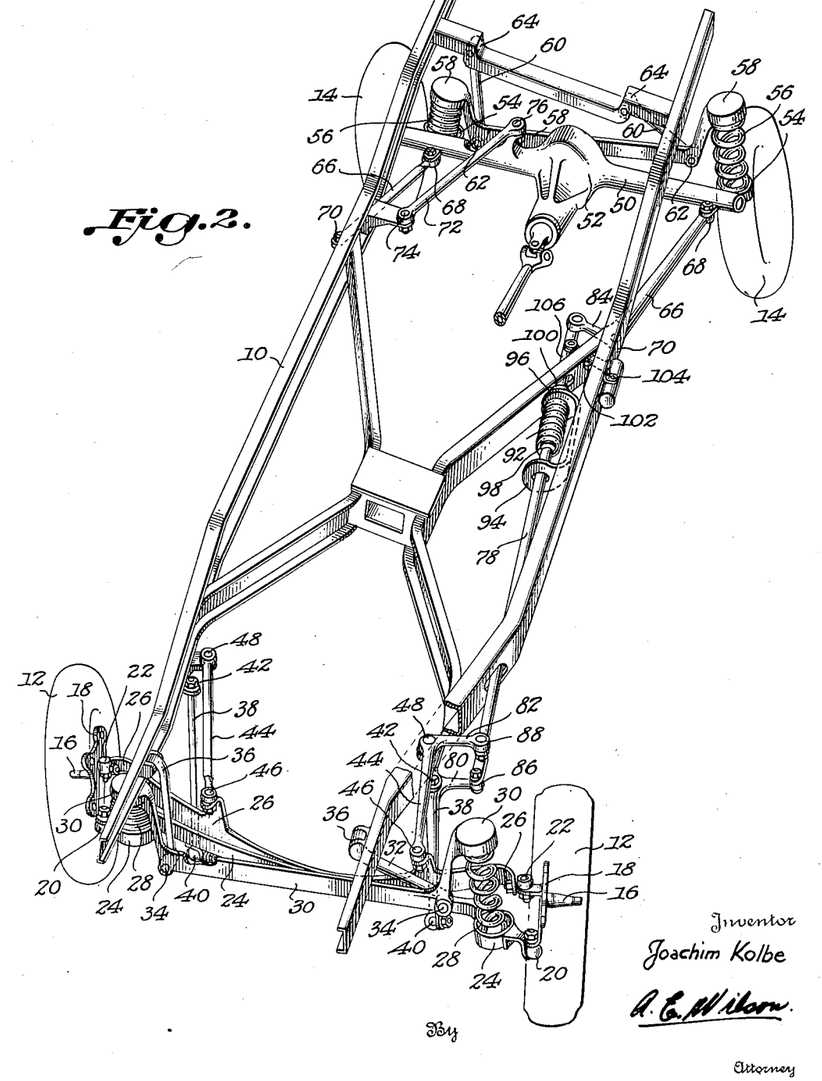
Fig. 2 is a perspective view of the vehicle illustrated in Fig. 1 shown in the angularly inclined or banked position.
Figure 3:
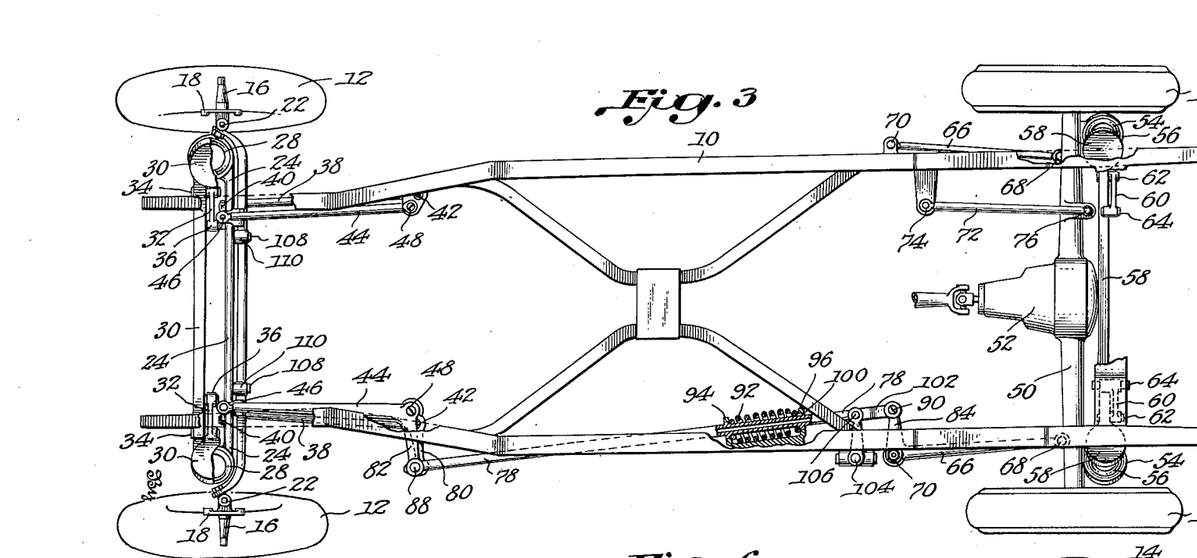
Fig. 3 is a plan view partly in section of the vehicle illustrated in Fig. 1.

As illustrated in Fig. 2, the springs on the outside of the curve are subjected to increased load as the vehicle rounds the curve and the springs on the inside of the curve are subjected to decreased load as is conventional with the normal automobile. The resulting angular movement and lateral displacement of the spring supporting members 30 and 58 above the springs is not accompanied by an angular movement of the superstructure toward the outside of the curve as is customary in normal vehicles because the angularly inclined links 32 at the front and 60 at the rear on the outside of the curve elevate as the superstructure shifts laterally to raise the superstructure on the outside of the curve, and the angularly inclined links on the inside of the curve shift downwardly to lower the side of the superstructure on the inside of the curve, thereby assuring the desired angularly inclined or banked positioned of the superstructure toward the inside of the curve as the vehicle rounds a curve. It will be understood of course that if desired the angularly inclined links 32 and 60 may be so proportioned that rather than assume an angularly inclined position toward the inside of the superstructure as the vehicle rounds a curve, the superstructure will be maintained in a substantially horizontal position as the vehicle rounds a curve.

Figures 9, 10:
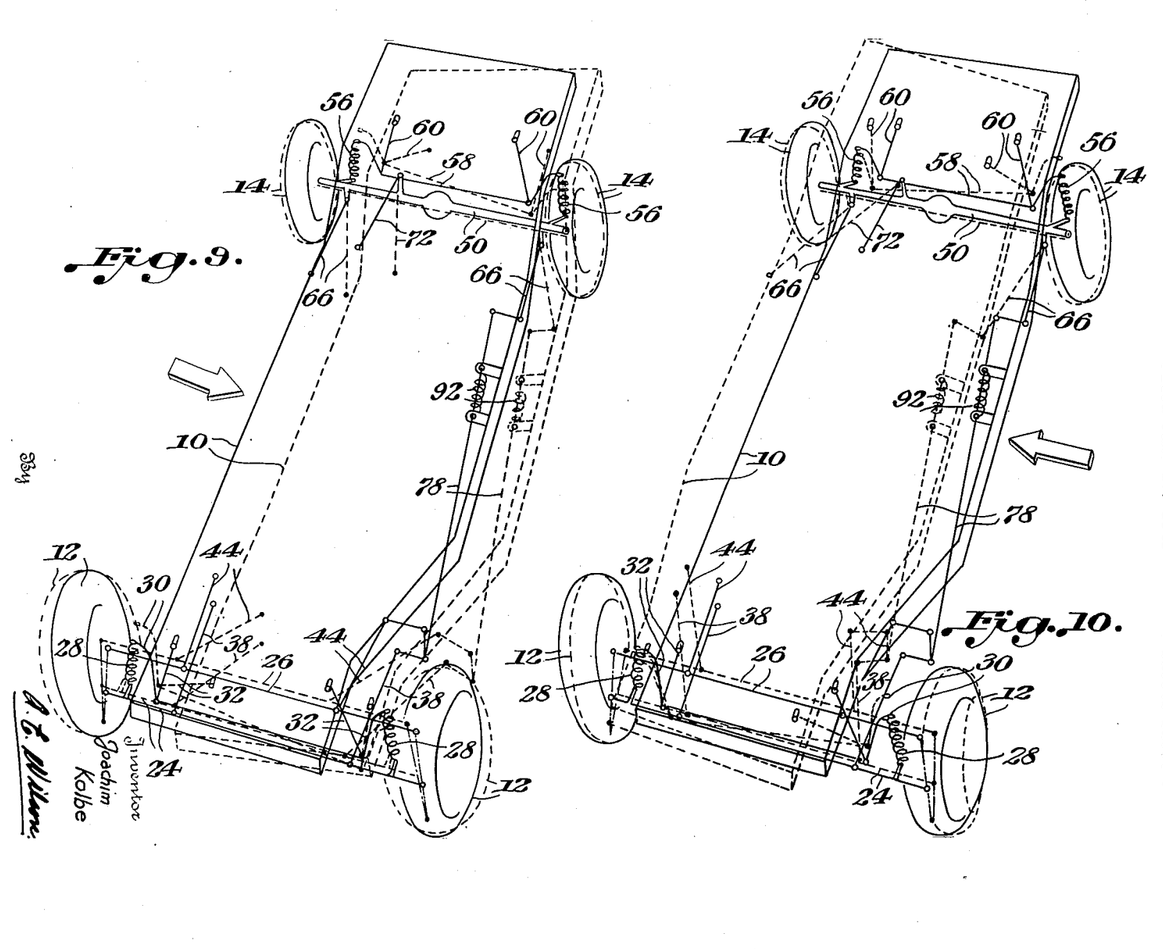
Figs. 9 and 10 are motion diagrams showing the relation between the normal and inclined positions of the structural parts of the vehicle illustrated in Fig. 1 shown in the right and left banked positions respectively.

Referring to Figs. 9 and 10, it will be observed that these figures are motion diagrams illustrating the relation of the principal actuating portions of the chassis drawn in full line for the normal or upright position and drawn in dotted line in Fig. 9 as the vehicle rounds a curve to the right and in Fig. 10 as the vehicle rounds a curve to the left.

Figs. 9 and 10 illustrate furthermore that the front transversely extending members 24 and 26 move to a small extent longitudinally of the vehicle toward the rear axle 50, and the rear axle 50 moves toward the front transversely extending members as the superstructure moves laterally toward the outside of the curve above the angularly inclined links 32 and 60. This shortening of the longitudinal distance between the front and rear wheels because of the angular movement of the front rods 38 and 44 and the rear rods 66 and 72 and its advantage for a simple steering arrangement for vehicles of this kind is more fully explained in my co-pending application Serial No. 279,845, filed June 19, 1939, now Patent No. 2,271,505, issued January 27, 1942.

The motion diagrams also clearly illustrate the longitudinal movement of the rod 78 to maintain the front wheels 12 in alignment with the rear wheels 14. They furthermore also illustrate the fact that the upper transversely extending member 26 moves laterally a greater distance than the lower transversely extending member 24 toward the inside of the curve upon longitudinal movement of the rod 78 as the vehicle assumes an angularly inclined or banked position to induce the wheels to assume an angularly inclined position toward the inside of the curve.

Figure 11:
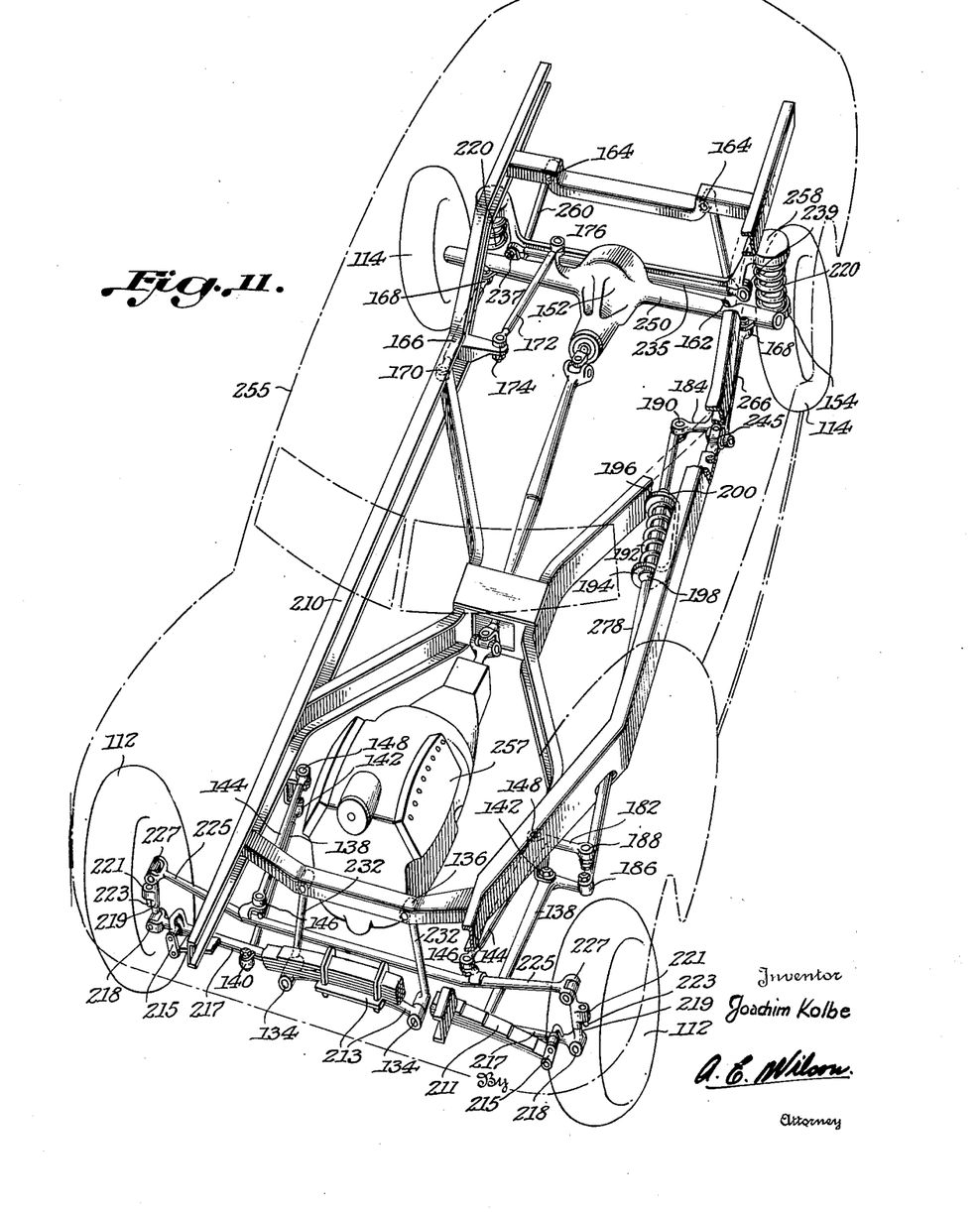
Fig. 11 is a perspective view of a modified form of the invention.

The embodiment of the invention illustrated in Fig. 11 is very similar in many respects to that illustrated in Figs. 1 to 10. Corresponding parts have therefore been given corresponding reference numerals with the addition of 200.

A transversely extending leaf spring 211 is in the front of the vehicle interposed between the saddle 213 operably connected to the paired angularly inclined links 232 and shackles 215 which are interposed between the outer ends of the spring 211 and a lower transverse member 217. Member 217 is pivotally connected at 218 on both ends to brackets 219, each having a generally vertically extending bushing 221 adapted to receive a kingpin 223. The brackets 219 are pivotally connected adjacent their upper ends with a transversely extending member 225 by means of pivotal connections 227. The pivotal connections 218 and 227 between the bracket 219 and the lower and upper transversely extending members 217 and 225 respectively extend longitudinally of the vehicle.

It will be noted that a generally transversely extending rod 235 is connected by means of a ball and socket connection 237 with the rear axle 250 at one end and is connected by means of a ball and socket joint 239 with the saddle 258 to avoid lateral vibration of the saddle between the springs 220 and the links 260.

It will be noted that a universal joint 245 may be interposed between the frame 210 and the rod 266 with both axes in a vertical plane transversely to the longitudinal direction of the vehicle to prevent sagging of the longitudinal rod 278 and thereby to prevent binding on the ball and socket joint connected therewith.

A superstructure or body 255 indicated in dot dash lines in Fig. 11 is mounted on the frame 210, and an engine 257 is carried by the frame. It will be understood of course that the term superstructure or body as used herein includes all portions of the vehicle supported by the paired angularly inclined links regardless of whether or not a frame member is employed.

The operation of this embodiment of the invention corresponds closely with the operation of the embodiment illustrated in Figs. 1 to 10 inclusive.

Figure 12:
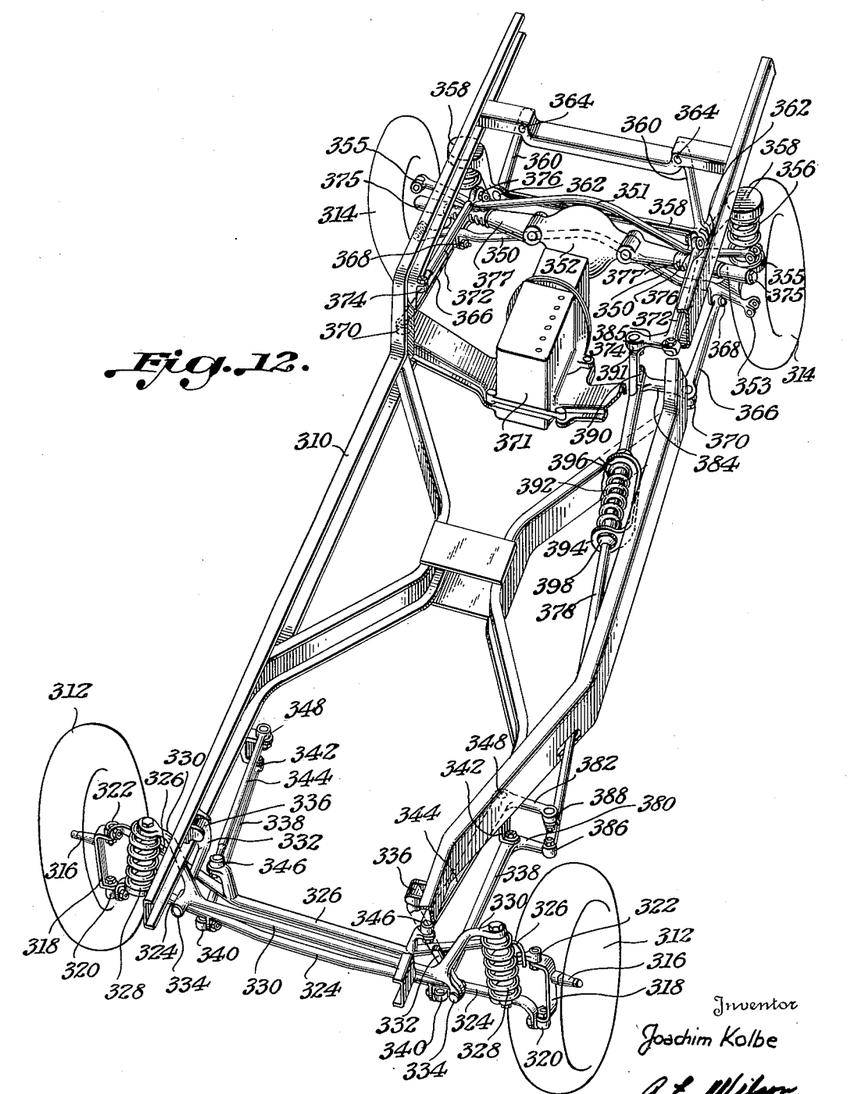
Fig. 12 is a perspective view of a still further modified form of the invention.

The embodiment of the invention illustrated in Fig. 12 is similar in many respects to that illustrated in Figs. 1 to 10. It will be noted however that Fig. 12 discloses a structure wherein the rear wheels as well as the front wheels are independently mounted in such a manner that they may also move to an angularly inclined or banked position toward the inside of the curve under the influence of centrifugal forces to which the vehicle is subjected as it rounds the curve.

Corresponding reference numerals have been applied to corresponding parts of the structure illustrated in Fig. 12 with the addition of 300, to the reference characters of the embodiment of the invention illustrated in Figs. 1 to 10.

The rear or non-steerable wheels as well as the front wheels are mounted in such a manner as to move independently relative to each other, and to assume an inclined position or to remain in a vertical position as the vehicle turns a curve.

It will be observed that the body or superstructure 310 includes a rear mounted engine 371. The front or steerable wheels 312 are carried by a pair of spindles 316 which are preferably integral parts of brackets 318. The brackets are connected by means of ball and socket joints 320 and 322 to generally transversely extending vertically spaced members 324 and 326. The member 324 is connected by means of ball and socket joints 340 to generally longitudinally extending transversely spaced rods 338 which are connected to the superstructure 310 by means of ball and socket joints 342. The member 326 is connected by means of ball and socket joints 346 to paired generally longitudinally extending transversely spaced rods 344 which in turn are connected to the superstructure 310 by means of ball and socket joints 348.

Suitable resilient means such for example as springs 328 carried by the members 324 may be provided to absorb vertical shocks to which the wheels 312 are subjected. Suitable supporting means such for example as the generally transversely extending saddle member 330 is provided to engage the springs 328 and support paired angularly inclined links 332 pivotally connected to the member 330 at 334 with their pivot axis in the longitudinal direction of the vehicle. The links 332 are pivotally connected to the superstructure at 336 in such a manner that the superstructure 310 may shift transversely under the influence of lateral forces to assume an inclined or banked position.

Rear or driving wheels 314 are independently movably mounted on generally transversely extending members 350 and 351 by means of pivots 353 and 355 respectively with their axis in the longitudinal direction of the vehicle. The member 350 is connected by means of ball and socket joints 368 to paired transversely spaced generally longitudinally extending rods 366 which are connected to the superstructure 310 by means of ball and socket joints 370. The member 351 is connected by means of ball and socket joints 376 to paired transversely spaced longitudinally extending rods 372 which in turn are connected to the superstructure by means of ball and socket joints 374.

The generally longitudinally extending rods 338 and 344 at the front of the vehicle may be connected with the generally longitudinally extending rods 366 and 372 at the rear of the vehicle to maintain the front and rear wheels in proper alignment.

Means associated with these connecting means between front and rear of the vehicle may be provided to control the movement of the wheels when assuming an angularly inclined or banked position towards the inside of the curve as the vehicle is subjected to centrifugal force.

One desirable form of such means includes arms 380 and 382 carried by the rods 338 and 344 at the front, and arms 384 and 385 carried by the rods 366 and 372 respectively at the rear of the vehicle. The relations between the length of the front arms 380 and 382 may, as illustrated, be such that when connected to the generally longitudinally movable bar 378 by means of ball and socket joints 386 and 388, the arms in the front are interconnected with the arms 384 and 385 in the rear by means of the ball and socket joints 390 and 391. The generally transversely extending front and rear wheel supporting means 326 and 351 may then be moved transversely relative to the supporting means 324 and 350 to guide the wheels in an angular position towards the inside of the curve.

If desired, the front rods 338 and 344 and the arms 380 and 382 may be formed as bell cranks, and the rear rods 366 and 372 and the arms 384 and 385 may also be formed as bell cranks. These bell cranks may be proportioned in such a manner as to only prevent the wheels from assuming an angular position towards the outside of the curve rather than positively moving them to an angular position towards the inside of the curve. Suitable means such for example as a spring 392 may be placed between the bracket arms 394 and 396 of the superstructure 310 and the shoulders 398 and 399 with which the longitudinally movable member 378 is provided, and may be arranged in such a manner as to yieldingly urge the member 378 towards a substantially predetermined normal position to maintain the superstructure 310 in the substantially upright position.

Suitable resilient means such for example as springs 356 carried by the member 350 may be provided to absorb vertical shocks to which the wheels 314 are subjected. Any suitable supporting means such for example as a generally transversely extending member 358 may be provided to engage the springs 356 and support paired angularly inclined links 360 pivotally connected to the member 350 at 362 with the pivot axes of the connections extending longitudinally of the vehicle. The links 360 are pivotally connected to the superstructure 310 at 364 in the same manner to allow the superstructure 310 to shift transversely under the influence of lateral forces to assume an inclined or banked position.

The operation of this embodiment of the invention is as follows: As the superstructure is subjected to lateral forces as when rounding a curve, it shifts laterally on the front and rear links 382 and 360 to assume an inclined or banked position toward the inside of the curve. Lateral movement of the superstructure 310 is transmitted through the front arms 380 and 382 which are preferably integral parts of the rods 338 and 344 to move the members 324 and 326 laterally relative to each other in the same direction but with different speed to induce the wheels 312 to assume an angularly inclined position towards the inside of the curve.

The rear arms 384 and 385 cooperate with the rods 366 and 372 to move the members 350 and 351 laterally relative to each other in the same direction but with different speed to induce the wheels 314 to assume an angularly inclined or banked position towards the inside of the curve. The spring 392 yieldingly urges the superstructure 310 back to the normal or substantially upright position as the force inducing the lateral displacement is decreased.

The engine 371 is operably connected to drive gears positioned in a differential housing 352 having transversely extending slidable axle arms 377 operably connected to axle members 375 operably connected to drive the wheels 314.

In the embodiments shown and described the superstructure will shift to a banked position. The rear axle, even if in the form of a rigid rear axle will be kept in a position perpendicular to the direction of the vehicle, and the front or steerable wheels will each be permitted to move vertically independently of each other when driving over obstacles in the road. These wheels may assume an angular position inclined to the inside of the curve under the influence of centrifugal force. All of these advantages may be accomplished by a movement of the center of gravity of the superstructure of approximately two inches towards the outside of the curve and downwardly in the direction of the centrifugal force.

It will be understood that the front and rear wheel supporting members may take any desired form, whereby the wheels may be moved to an angular position under the influence of centrifugal force. Furthermore, the connections between all guiding members of the chassis specified above mostly as ball and socket joints, may be in the form of simple rubber rings preferably placed around the members transversely arranged and embraced by the ends of the longitudinally arranged rods. A complete front end unit and a corresponding rear end unit may be inexpensively manufactured making use of the fact that the motion in the joints is far less for normal drive at least than that occurring in arrangements with short wishbone arm suspensions.

It will be understood that the means for inducting the wheels to assume an angularly inclined or banked position towards the inside of the curve is in no way limited to use with a vehicle having a superstructure or body so mounted that it may assume a banked position. Practically all modern vehicles embody some lateral shifting of the center of gravity of the body or superstructure relative to the wheel supporting means as the vehicle rounds a curve due to the flexing of the resilient means employed to absorb vertical shocks. This lateral shifting of the body above the springs may be utilized to shift the wheels into an angularly inclined or banked position, or may be employed to merely maintain the wheels in a vertical position thereby preventing them from being forced to an angular position towards the outside of the curve.

I claim:

1. In a motor vehicle having wheels, a superstructure, a front running gear including wheel supported members, transversely extending connecting means between said wheel supported members, vertically spaced generally longitudinally extending connecting means between the superstructure and said transversely extending connecting means, angularly inclined linkage means interposed between the transversely extending connecting means and the superstructure whereby the superstructure may shift laterally relative to said wheel supported members under the influence of lateral forces exerted thereon as the vehicle rounds a curve, said longitudinally extending connecting means cooperating with the transversely extending connecting means and operated by lateral movement of the superstructure relative to said wheel supported members to induce said wheels to assume an angularly inclined position toward the inside of the curve.

2. In a motor vehicle, a superstructure, front and rear running gears including wheel supported members, transversely extending connecting means between the front and rear wheel supported members, resilient means carried by the transversely extending members, transversely spaced supporting members carried by the resilient means, angularly inclined links interposed between said supporting members and the superstructure, generally longitudinally extending connecting means between the superstructure and the front and rear transversely extending connecting means whereby the superstructure may shift laterally under the influence of external forces acting on the vehicle as it rounds a curve to move the superstructure toward an angularly inclined position toward the inside of the curve accompanied by a lateral shifting of said transversely extending connecting means to induce the wheels to move to an angularly inclined position toward the inside of the curve.

3. A motor vehicle comprising a superstructure, front and rear running gears including wheel supported members, vertically spaced transversely extending connecting means interposed between the front and rear wheel supported members, springs carried by the transversely extending connecting means, spring saddles carried by the springs, angularly inclined links interposed between the superstructure and the spring saddles, vertically spaced bell cranks universally connected to the superstructure and universally connected to the vertically spaced transversely extending connecting means at the front and rear of the vehicle, the angularly related arms of the front and rear bell crank extending in opposite directions, a generally longitudinally extending rod interconnecting said arms, and resilient means carried by the superstructure and operable by longitudinal movement of said rod to exert a force thereon tending to return the rod to a substantially predetermined neutral position to induce the superstructure to maintain an upright position relative to said running gears, said bell cranks and said longitudinally extending rod being so constructed and arranged that as the superstructure shifts laterally relative to the running gears the vertically space connection to the transversely extending connecting means induce the wheel supported members to shift laterally toward the inside of the curve.

4. In a motor vehicle, a superstructure, a front running gear including wheel supported members, vertically spaced connecting means between the wheel supported members, vertically spaced longitudinally extending members interconnecting the superstructure and said vertically spaced connecting means, resilient means carried by one of said vertically spaced connecting means, a spring saddle carried by the resilient means, angularly inclined links interposed between the spring saddle and superstructure, a rear running gear including a wheel supported member, vertically spaced longitudinally extending members interconnecting said wheel supported member and the superstructure, resilient means carried by said wheel supported member, a spring saddle carried by said resilient means, angularly inclined rear links interposed between said saddle and the superstructure whereby the superstructure may shift laterally under the influence of lateral forces and assume an angularly inclined position, the connecting means between the superstructure and the running gears being so constructed and arranged that as the superstructure shifts laterally the steerable wheels are moved to a position inclined to the inside of the curve.

5. In a motor vehicle having wheels, a superstructure, a front running gear including wheel supported members, transversely extending connecting means universally connected with said wheel supported members, said connections being so constructed and arranged that steering movements may be transmitted to the wheels, vertically spaced generally longitudinally extending connecting means between the superstructure and said transversely extending connecting means, angularly inclined linkage means interposed between the transversely extending connecting means and the superstructure whereby the superstructure may shift laterally relative to said wheel supported members under the influence of lateral forces exerted thereon as the vehicle rounds a curve, said longitudinally extending connecting means cooperating with the transversely extending connecting means and operated by lateral movement of the superstructure relative to said wheel supported members to induce said wheels to assume an angularly inclined position toward the inside of the curve.

6. In a motor vehicle a superstructure, a front running gear including wheel supported members, vertically spaced connecting means between the wheel supported members, vertically spaced longitudinally extending members interconnecting the superstructure and said vertically spaced connecting means, resilient means carried by one of said vertically spaced connecting means, a spring saddle carried by the resilient means, angularly inclined links interposed between the spring saddle and superstructure whereby the superstructure may shift laterally under the influence of lateral forces and assume an angularly inclined position, the connecting means between the superstructure and the running gear being so constructed and arranged that as the superstructure shifts laterally the wheels remain in a substantially upright position.

7. In a motor vehicle, a superstructure, front and rear running gears including wheel supported members, vertically spaced connecting means between the wheel supported members, vertically spaced longitudinally extending members interconnecting the superstructure and said vertically spaced connecting means, resilient means carried by one of said vertically spaced connecting means in the front and rear respectively, spring saddles carried by the resilient means, angularly inclined links interposed between the spring saddles and the superstructure, interconnecting means between said front and rear connecting means, the connecting means between the superstructure and the front and rear running gears being so constructed and arranged that with the lateral displacement of the superstructure under the influence of lateral forces the superstructure and wheels move into a position inclined to the inside of the curve.

8. A motor vehicle comprising wheel supporting means, wheels carried by said wheel supporting means, resilient means associated with the wheel supporting means, support members carried by the resilient means, a superstructure, connecting means between the superstructure and said support members whereby the superstructure may shift laterally relative to the wheels under the influence of centrifugal force as the vehicle rounds a curve, and connecting means between the superstructure and wheel supporting means being so constructed and arranged that the wheels are moved to an angularly inclined or banked position towards the inside of the curve by lateral shifting of the superstructure relative to the wheels as the vehicle rounds a curve.

9. In a motor vehicle having front and rear wheel supporting means, the front wheel supporting means comprising vertically spaced transversely movable members, a superstructure, resilient means associated with the front and rear wheel supporting means, support members carried by the resilient means, linkage means between said support members and the superstructure whereby the superstructure may shift laterally above the resilient means when subjected to centrifugal force as the vehicle rounds a curve, and means actuated by lateral shifting of the superstructure above the resilient means and linkage means to move said front vertically spaced transversely movable members laterally relative to the superstructure at varying speeds to induce the front wheels to assume an angularly inclined or banked position towards the inside of the curve.

10. In a vehicle having independently movable front wheels and front and rear wheel supported means, resilient means carried by the wheel supported means, a superstructure, connecting means between the superstructure and resilient means including front and rear paired angularly inclined links whereby the superstructure and the wheels under the influence of centrifugal force may remain in an upright vertical position, the front wheel supported means comprising two vertically extending members and two transversely extending members, front and rear generally longitudinally extending members interconnecting the superstructure and the wheel supported means, the front longitudinally extending members being connected to one of said transversely extending members, auxiliary generally longitudinally extending members between the superstructure and the front and rear wheel supporting means in a different horizontal plane than the before mentioned generally longitudinally extending members, said auxiliary means in the front universally connected to the other of said transversely extending members, crank arms carried by at least two of said longitudinally extending members in the front and by one in the rear, the latter oppositely disposed to those of the front, connecting means jointly connected to said crank arms and so dimensioned and arranged that the superstructure will assume substantially uniform lateral movement relative to the front and rear wheel supported means, and resilient means operably connected to the last named means to return the superstructure to its normal position.

11. In a vehicle having a rigid rear axle, resilient means including transversely spaced coil springs associated with the rigid axle, a generally transversely extending member interconnecting the coil springs, a generally transversely extending guide bar interposed between said member and the axle to limit lateral movement of the member relative to the axle, a superstructure, connecting means between the superstructure and the generally transversely extending member comprising angularly inclined links whereby the superstructure may assume an angularly inclined or banked position relative to the rear axle when subjected to lateral forces, front wheel supporting means comprising two generally transversely extending beams and two generally vertically disposed king pin bearers, said beams and king pin bearers being hingedly interconnected, connecting means between the superstructure and said beams, resilient means associated with the beams, a support member carried by the resilient means, and paired angularly inclined links pivotally connected to the superstructure and to said support member, and longitudinally extending connecting means between the front and rear wheel supporting means.

12. In a motor vehicle having wheels, a superstructure, a rear running gear, a front running gear including wheel supported members, transversely extending connecting means between said wheel supported members, vertically spaced generally longitudinally extending connecting means between the superstructure and said transversely extending connecting means, linkage means and resilient means interposed between the transversely extending connecting means and the superstructure whereby the superstructure may shift laterally relative to said wheel supported members under the influence of lateral forces exerted thereon as the vehicle rounds a curve, said longitudinally extending connecting means cooperating with the transversely extending connecting means controlled by the rear running gear and operated by lateral movement of the superstructure relative to said wheel supported members to maintain said wheels in an upright position.

13. In a motor vehicle, a superstructure, front and rear running gears including wheel supported members, transversely extending connecting means between the front and rear wheel supported members, resilient means carried by the transversely extending members, linkage means interposed between said resilient means and the superstructure, generally longitudinally extending connecting means between the superstructure and the front and rear transversely extending connecting means whereby the superstructure may shift laterally under the influence of external forces acting on the vehicle as it rounds a curve to move the superstructure toward an angularly inclined position toward the inside of the curve accompanied by a lateral shifting of said transversely extending connecting means to maintain the wheels in a substantially vertical position as the vehicle rounds a curve.

14. In a motor vehicle having steerable wheels, a superstructure, a rear running gear including wheel supported members, vertically spaced longitudinally extending members interconnecting said wheel supported members and the superstructure, resilient means carried by one of said wheel supported members, a spring saddle carried by said resilient means, angularly inclined links interposed between said saddle and the superstructure whereby the superstructure may shift laterally under the influence of lateral forces and assume an angularly inclined position, the connecting members between the wheel supported members and the superstructure being movable angularly in horizontal planes and so constructed and arranged that as the superstructure shifts laterally the steerable wheels remain in a substantially upright position.

15. In a motor vehicle, a superstructure, front and rear running gears including wheel supported members, vertically spaced connecting means between the wheel supported members, vertically spaced longitudinally extending members interconnecting the superstructure and said vertically spaced connecting means, resilient means carried by one of said vertically spaced connecting means in the front and rear respectively, spring saddles carried by the resilient means, angularly inclined links interposed between the spring saddles and the superstructure, interconnecting means between said front and rear connecting means, the connecting means between the superstructure and the front and rear running gears being so constructed and arranged that with the lateral displacement of the superstructure under the influence of lateral forces the superstructure moves into a position inclined to the inside of the curve and the wheels are maintained in their vertical planes.

16. In a motor vehicle, a superstructure, road engaging wheels, resilient means between the superstructure and the road engaging wheels, motion transmitting means between the superstructure and the resilient means whereby the superstructure may shift laterally in the direction of lateral forces exerted on the vehicle as it rounds a curve and assume an angularly inclined position towards the inside of the curve, motion transmitting means between the road engaging wheels and the resilient means whereby the wheels may move angularly, and means operated by lateral movement of the superstructure towards the outside of the curve to actuate the last named motion transmitting means to move the wheels towards an angularly inclined position towards the inside of the curve as the vehicle rounds a curve.

17. In a motor vehicle, a superstructure, road engaging wheels, supporting means for the wheels comprising relatively movable transversely extending members, connecting means between the wheels and said members so constructed and arranged that the wheels move angularly as said members move transversely relative to each other, linkage means interconnecting the superstructure and the transversely movable members whereby the superstructure may shift laterally in the direction of lateral forces exerted on the superstructure as the vehicle rounds a curve and assume an angularly inclined position towards the inside of the curve, and means operated by lateral shifting of the superstructure to actuate the transversely extending members to move the wheels angularly towards the inside of the curve.

18. In a motor vehicle, a superstructure, road engaging wheels, resilient means between the superstructure and the road engaging wheels, motion transmitting means between the superstructure and the resilient means whereby the superstructure may shift laterally in the direction of lateral forces exerted on the vehicle as it rounds a curve and avoid moving to an angularly inclined position towards the outside of the curve, motion transmitting means between the road engaging wheels and the resilient means whereby the wheels may move angularly, and means operated by lateral movement of the superstructure towards the outside of the curve to actuate the last named motion transmitting means to move the wheels angularly to maintain them in an upright position as the vehicle rounds a curve.

19. In a motor vehicle, a superstructure, steerable road engaging wheels, supporting means for the wheels comprising relatively movable transversely extending members, connecting means between the wheels and said members so constructed and arranged that the wheels move angularly as said members move transversely relative to each other, motion transmitting means interconnecting the superstructure and the transversely movable members whereby the superstructure may shift laterally in the direction of lateral forces exerted on the superstructure as the vehicle rounds a curve and assume an angularly inclined position towards the inside of the curve, and means operated by lateral shifting of the superstructure to actuate the transversely extending members to prevent the wheels from moving to an angularly inclined position towards the outside of the curve.

JOACHIM KOLBE.